(12) United States Patent
Fujita et al.

(10) Patent No.: US 9,863,721 B2
(45) Date of Patent: Jan. 9, 2018

(54) HEAT EXCHANGER (71) Applicant: Sumitomo Precision Products Co., Ltd., Amagasaki-shi, Hyogo (JP)

(72) Inventors: Yasuhiro Fujita, Amagasaki (JP); Hiroyuki Takahashi, Amagasaki (JP); Akihiro Tanabe, Amagasaki (JP)

(73) Assignee: Sumitomo Precision Products Co., Ltd., Amagasaki-shi (JP)

( * ) Notice: Subject to any disclaimer, the term of this patent is extended or adjusted under 35 U.S.C. 154(b) by 0 days.

(21) Appl. No.: 15/127,457

(22) PCT Filed: Mar. 16, 2015

(86) PCT No.: PCT/JP2015/057730
§ 371 (c)(1),
(2) Date: Sep. 20, 2016

(87) PCT Pub. No.: WO2015/146678
PCT Pub. Date: Oct. 1, 2015

(65) Prior Publication Data
US 2017/0131042 A1    May 11, 2017

(30) Foreign Application Priority Data
Mar. 24, 2014  (JP) .................. 2014-059595

(51) Int. Cl.
*B01J 8/06*      (2006.01)
*F28F 9/02*      (2006.01)
*F28D 9/00*      (2006.01)
*F28F 9/18*      (2006.01)
*F28F 3/02*      (2006.01)
*B01J 19/24*     (2006.01)
*F28D 21/00*     (2006.01)

(52) U.S. Cl.
CPC ............. *F28F 9/02* (2013.01); *B01J 8/067* (2013.01); *B01J 19/249* (2013.01); *F28D 9/0062* (2013.01); *F28F 3/025* (2013.01); *F28F 9/0219* (2013.01); *F28F 9/185* (2013.01); *B01J 2208/00212* (2013.01); *B01J 2208/065* (2013.01); *F28D 2021/0022* (2013.01); *F28F 2009/0297* (2013.01)

(58) Field of Classification Search
CPC ............. B01J 8/067; B01J 19/249; B01J 2208/00212; F28F 9/185; F28F 9/02; F28F 9/0219; F28F 9/025; F28D 9/0062
See application file for complete search history.

(56) References Cited

U.S. PATENT DOCUMENTS
2011/0114302 A1   5/2011   Dietz et al.

FOREIGN PATENT DOCUMENTS
JP   6-65775 U      9/1994
JP   2011-80750 A   4/2011

OTHER PUBLICATIONS

International Search Report (PCT/ISA/210) issued in PCT Application No. PCT/JP2015/057730 dated Jun. 2, 2015 with English translation (5 pages).
Japanese-language Written Opinion (PCT/ISA/237) issued in PCT Application No. PCT/JP2015/057730 dated Jun. 2, 2015 (3 pages).

*Primary Examiner* — Lessanework Seifu
(74) *Attorney, Agent, or Firm* — Crowell & Moring LLP (57) ABSTRACT

This heat exchanger (100) includes a core portion (1), a header portion (2), and an intermediate member (3), and the curvature radius of a corner (31*a* to 31*d*) of the intermediate member is configured to be smaller than the curvature radius at a header portion side.

5 Claims, 6 Drawing Sheets

HEAT EXCHANGER

TECHNICAL FIELD

The present invention relates to a heat exchanger, and more particularly, it relates to a heat exchanger including a core portion that exchanges heat and a header portion mounted on the core portion.

BACKGROUND ART

A heat exchanger including a core portion that exchanges heat and a header portion mounted on the core portion is known in general. A heat exchanger like this is disclosed in Japanese Patent Laying-Open No. 2011-80750 and Japanese Utility Model Laying-Open No. 6-65775, for example.

In Japanese Patent Laying-Open No. 2011-80750 and Japanese Utility Model Laying-Open No. 6-65775, there is disclosed a heat exchanger including a heat exchange block (core portion) that exchanges heat, a header portion for supplying a fluid to the heat exchange block (core portion) or discharging the fluid from the heat exchange block (core portion), and an intermediate member (joint plate) made of metal and provided between the heat exchange block (core portion) and the header portion. In this heat exchanger, the intermediate member (joint plate) made of metal is formed of a rectangular frame body (a frame body having right-angled corners in a plan view). One side of the intermediate member (joint plate) is brazed or welded to the heat exchange block (core portion), and the other side of the intermediate member is welded to the header portion. The heat exchange block (core portion) has a rectangular parallelepiped shape.

PRIOR ART

Patent Document

Patent Document 1: Japanese Patent Laying-Open No. 2011-80750
Patent Document 2: Japanese Utility Model Laying-Open No. 6-65775

SUMMARY OF THE INVENTION

Problems to be Solved by the Invention

In general, when the header portion is formed by press working, the corners of the header portion are formed in a curved surface shape (an arcuate shape in a plan view). In this case, the heat exchanger according to Japanese Patent Laying-Open No. 2011-80750 and Japanese Utility Model Laying-Open No. 6-65775, the corners of the intermediate member (joint plate) are right-angled in a plan view, and hence there is such a problem that the header portion and the intermediate member cannot be bonded to each other (a gap is generated in a bonding portion between the header portion and the intermediate member) due to a difference in shape between the arcuate corners of the header portion and the right-angled corners of the intermediate member.

Thus, the corners of the intermediate member may be formed in an arcuate shape to fit into the arcuate corners of the header portion. However, when the corners of the intermediate member are formed in an arcuate shape to fit into the arcuate corners of the header portion, as just described, there is such a problem that flow paths arranged in the vicinity of the corners of the heat exchange block having a rectangular shape in a plan view, of multiple flow paths through which the fluid of the heat exchange block flows, are not covered with the header portion (intermediate member) (is exposed to the outside).

The present invention has been proposed in order to solve the aforementioned problems, and one object of the present invention is to provide a heat exchanger in which a header portion and an intermediate member can be bonded to each other while exposure of flow paths of the core portion to the outside is suppressed even when the corners of the header portion are formed in an arcuate shape.

Means for Solving the Problems

In order to attain the aforementioned object, a heat exchanger according to an aspect of the present invention includes a core portion that includes a flow path through which each of a first fluid and a second fluid flows, and exchanges heat between the first fluid and the second fluid, a header portion that is mounted on the core portion and allows the first fluid or the second fluid to flow into the flow path or flow out of the flow path, and an intermediate member that is provided between the core portion and the header portion, has a frame shape, and bonds the core portion and the header portion to each other, and the curvature radius, at a core portion side, of a corner of the intermediate member is smaller than the curvature radius, at a header portion side, of the corner of the intermediate member.

In the heat exchanger according to this aspect of the present invention, as hereinabove described, the curvature radius, at the core portion side, of the corner of the intermediate member provided between the core portion and the header portion is smaller than the curvature radius, at the header portion side, of the corner of the intermediate member, whereby the flow path provided in a corner of the core portion can be covered with the intermediate member, and hence the header portion and the intermediate member can be bonded to each other even when a corner of the header portion is formed in an arcuate shape. Consequently, even when the corner of the header portion is formed in an arcuate shape, the header portion and the intermediate member can be bonded to each other while exposure of the flow path of the core portion to the outside is suppressed.

Preferably in the aforementioned heat exchanger according to this aspect, the heat exchanger includes a catalytic reactor in which the core portion is filled with a catalyst, and the intermediate member includes a curvature radius changing portion provided closer to the core portion, of which the curvature radius at the core portion side is smaller than the curvature radius at the header portion side, and a curvature radius non-changing portion connected to the curvature radius changing portion and provided closer to the header portion, of which the curvature radius of a corner is not substantially changed from the side of the core portion toward the side of the header portion. When the core portion of the heat exchanger is filled with the catalyst so that the heat exchanger is used as the catalytic reactor, it is necessary to periodically replace the catalyst. In this case, it is necessary to replace the catalyst and mount the header portion by welding again after the welded header portion is cut at a boundary between the header portion and the intermediate member. At this time, heat-affected portions generated at the boundary between the header portion and the intermediate member due to heat during welding are scraped off before welding. Thus, according to the present invention, the intermediate member includes the curvature radius non-changing portion, of which the curvature radius of the corner is not substantially changed from the side of the core portion toward the side of the header portion, whereby the curvature radius of the curvature radius non-changing portion is not changed by cutting at the boundary between the curvature radius non-changing portion and the header portion even when the heat-affected portion of the curvature radius non-changing portion is scraped off. Thus, the curvature radius non-changing portion and the header portion can be easily welded to each other after the heat-affected portion is scraped off.

Preferably in the aforementioned heat exchanger in which the intermediate member includes the curvature radius changing portion and the curvature radius non-changing portion, by press working, the header portion is formed in a substantially rectangular shape having four arcuate corners, as viewed in a direction in which the header portion is mounted, and the curvature radii of four corners of the curvature radius non-changing portion are more than one and a half times the thickness of the header portion and are substantially equal to the curvature radius of the header portion at a boundary between the curvature radius non-changing portion and the header portion. Note that the curvature radii of the corners of the header portion on which press working has been performed are at least one and a half times the thickness of the header portion. Thus, according to the present invention, the curvature radii of the corners of the curvature radius non-changing portion are more than one and a half times the thickness of the header portion and are substantially equal to the curvature radius of the header portion at the boundary between the curvature radius non-changing portion and the header portion, whereby the header portion on which press working has been performed can be easily welded to the curvature radius non-changing portion. The term "as viewed in a direction in which the header portion is mounted" indicates a wide concept including the case where the heat exchanger is viewed from above, from below, and laterally.

Furthermore, the header portion is formed by press working, whereby the header portion can be easily formed, unlike the case where the header portion is formed by welding multiple members.

Preferably in the aforementioned heat exchanger in which the intermediate member includes the curvature radius changing portion and the curvature radius non-changing portion, the header portion and the curvature radius non-changing portion are bonded to each other by welding, and when the catalyst provided in the core portion is replaced, the header portion is cut at a portion welded to the curvature radius non-changing portion, the catalyst is replaced, and thereafter the header portion and the curvature radius non-changing portion are bonded again to each other by welding. According to this structure, even when the heat-affected portion of the curvature radius non-changing portion is scraped off, the curvature radius of the curvature radius non-changing portion is not changed, and hence the curvature radius non-changing portion and the header portion can be easily welded to each other after the heat-affected portion is scraped off. Consequently, replacement operations for the catalyst can be facilitated.

Preferably in this case, in the vicinity of the portion of the header portion welded to the curvature radius non-changing portion, the thickness t1 of each of portions of the header portion and the curvature radius non-changing portion scraped off due to a thermal effect is up to a value expressed by the following formula (1) where t2 is the thickness of the header portion, and after each of the header portion and the curvature radius non-changing portion is scraped off by the thickness t1, the header portion and the curvature radius non-changing portion are bonded again to each other by welding. According to this structure, as compared with the case where portions other than the portions of the header portion and the curvature radius non-changing portion scraped off due to a thermal effect are also scraped off, a reduction in the lengths of the header portion and the curvature radius non-changing portion is suppressed, and hence a change in the height position of a rectification portion provided in the header portion is suppressed. Consequently, an influence on a rectification effect caused by cutting of the header portion can be suppressed.

[Mathematical Formula 2]

$$t1=2.0\times\sqrt{t2} \quad (1)$$

Effect of the Invention

According to the present invention, as hereinabove described, even when the corner of the header portion is formed in an arcuate shape, the header portion and the intermediate member can be bonded to each other while exposure of the flow path of the core portion to the outside is suppressed.

MODES FOR CARRYING OUT THE INVENTION

An embodiment of the present invention is hereinafter described on the basis of the drawings.

The structure of a heat exchanger 100 according to this embodiment is now described with reference to FIGS. 1 to 8 and view (a) of 9.

Figure 1:
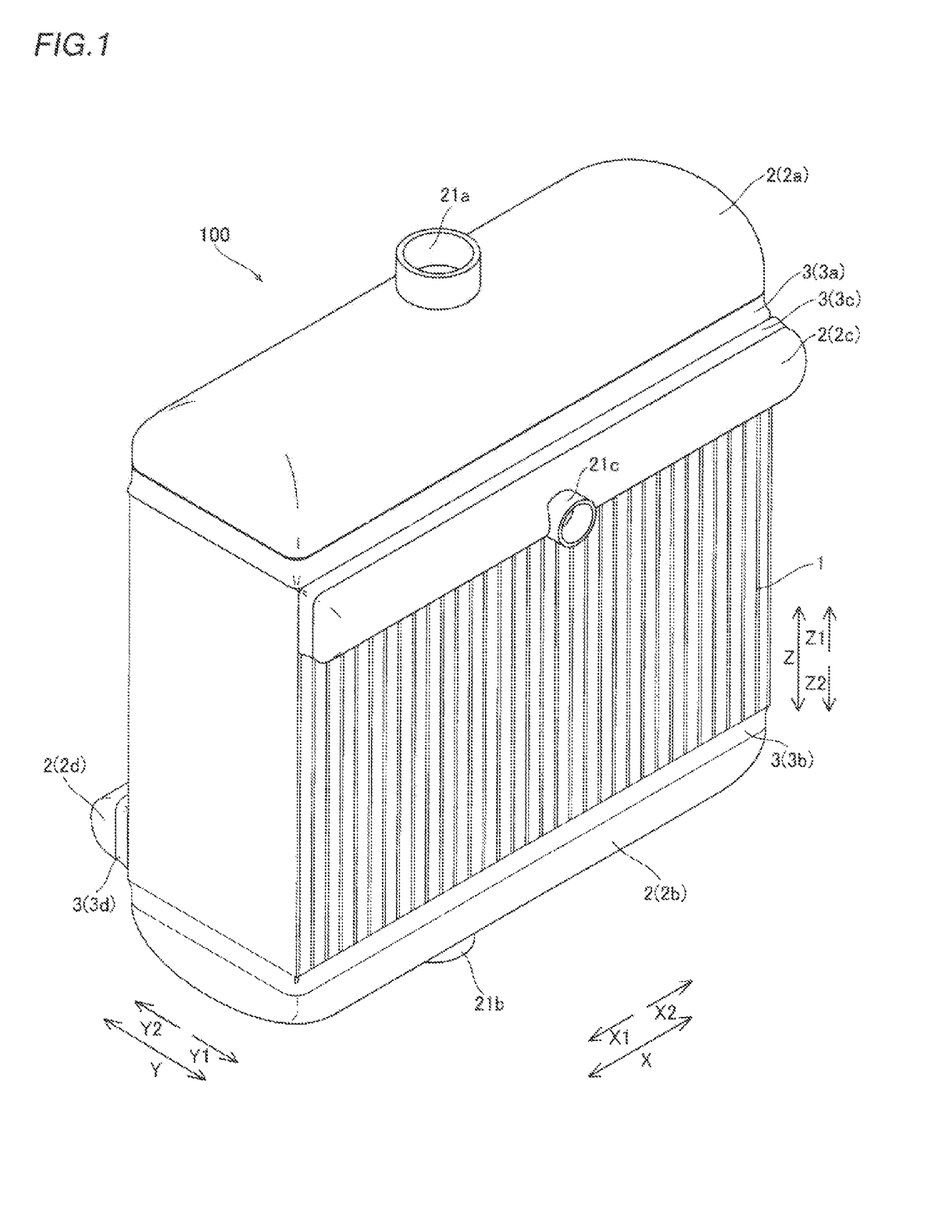
FIG. 1 A perspective view showing the structure of a heat exchanger according to an embodiment of the present invention.
Figure 2:
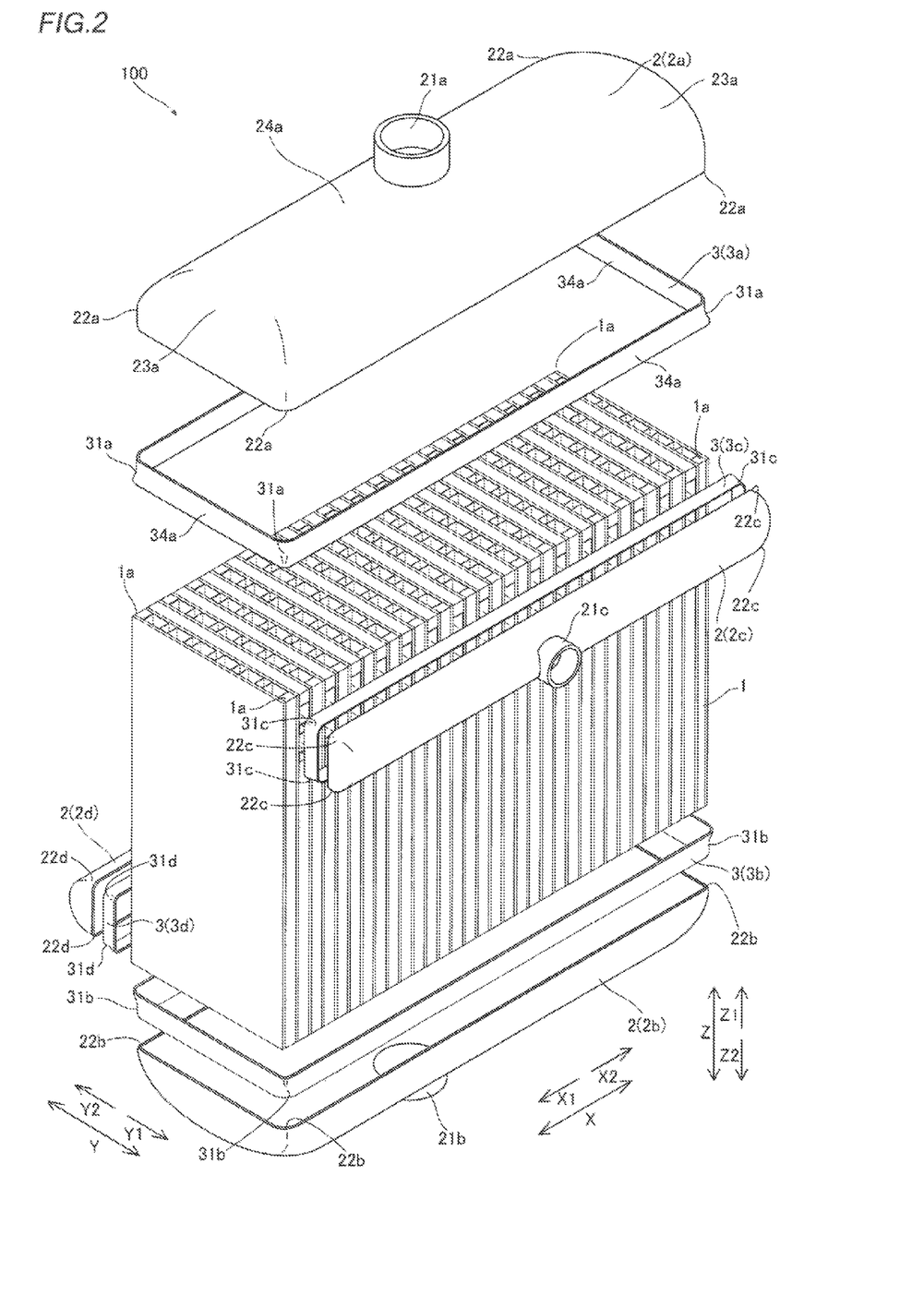
FIG. 2 An exploded perspective view showing the structure of the heat exchanger according to the embodiment of the present invention.

As shown in FIGS. 1 and 2, the heat exchanger 100 includes a core portion 1, header portions 2 (header portions 2a to 2d), and intermediate members 3 (intermediate members 3a to 3d). The core portion 1, the header portions 2, and the intermediate members 3 are made of metal.

Figure 5:
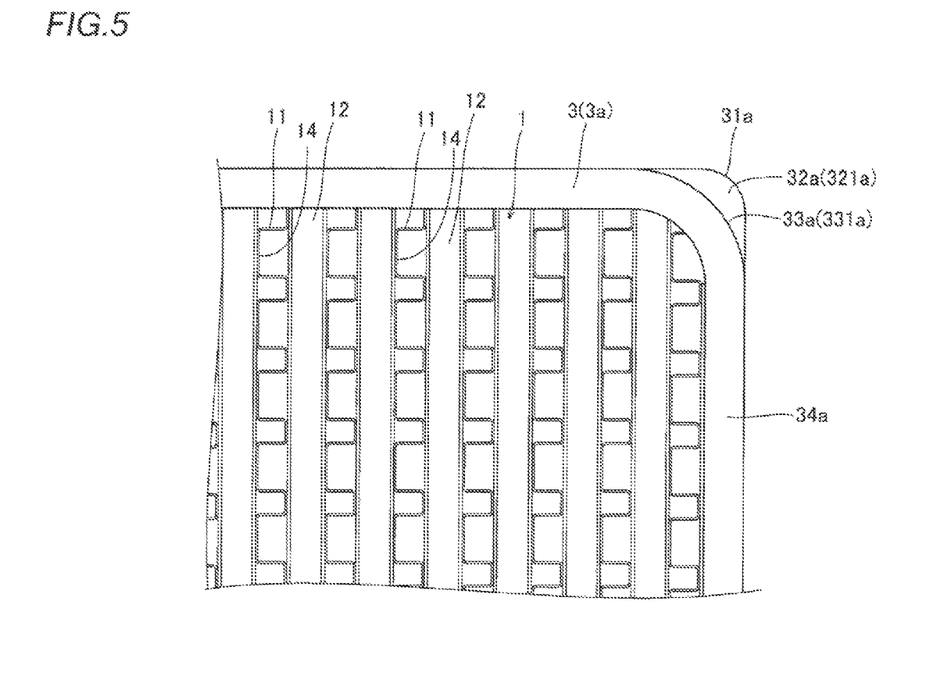
FIG. 5 A top view of a core portion and an intermediate member of the heat exchanger according to the embodiment of the present invention.

The core portion 1 includes flow paths 14 (see FIG. 5), described later, through which a first fluid having a relatively high temperature and a second fluid having a relatively low temperature flow, respectively, and is configured to exchange heat between the first fluid having a relatively high temperature and the second fluid having a relatively low temperature. The core portion 1 includes a plate-fin type core portion 1 in which fins 11 and separate plates 12 are alternately stacked, as shown in FIG. 5, for example. In regions surrounded by the fins 11 and the separate plates 12, the flow paths 14 (see FIG. 5) are formed. The flow paths 14 through which the first fluid or the second fluid flows are filled with a catalyst (not shown). Thus, the heat exchanger 100 serves as a catalytic reactor. As shown in FIGS. 1 and 2, the core portion 1 has a rectangular parallelepiped shape (a substantially rectangular shape including four corners 1a in a plan view).

The header portion 2a is provided above (Z1-direction side) the core portion 1 having a rectangular parallelepiped shape. The header portion 2a is provided with an inflow/outflow port 21a through which the fluids flow in or flow out. The header portion 2b is provided below (Z2-direction side) the core portion 1, and is provided with an inflow/outflow port 21b. The header portion 2c is provided laterally (Y1-direction side) to the core portion 1, and is provided with an inflow/outflow port 21c. The header portion 2d is provided laterally (Y2-direction side) to the core portion 1, and is provided with an inflow/outflow port 21d (see FIGS. 3 and 4). The header portions 2a to 2d are mounted on the core portion 1 by welding (or brazing). The header portions 2a to 2d have similar structures, and hence the header portion 2a is described below in detail.

According to this embodiment, by press working, the header portion 2a is formed in a substantially rectangular shape having four arcuate corners 22a, as viewed in a direction in which the header portion 2a is mounted (from above), as shown in FIGS. 1 to 4. Longitudinal direction ends 23a at an X1-direction side and an X2-direction side each have a substantially arcuate shape (see FIG. 3), as viewed in a direction X, and have a substantially arcuate shape (see FIG. 4), as viewed in a direction Y. A body portion 24a between the two longitudinal direction ends 23a has a substantially semicylindrical shape.

Figure 6:
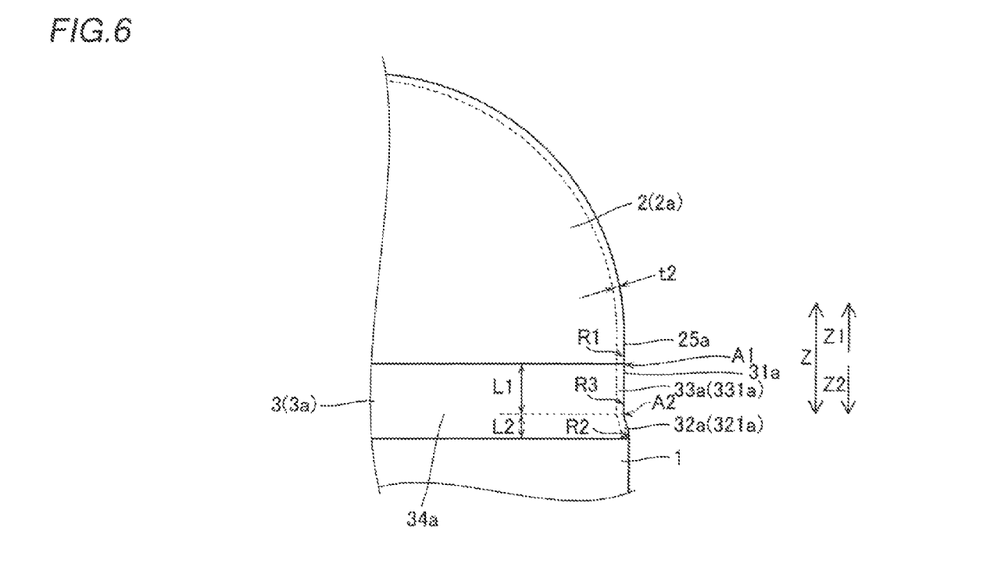
FIG. 6 A side elevational view of the corners of the core portion, the intermediate member, and a header portion according to the embodiment of the present invention.
Figure 7:
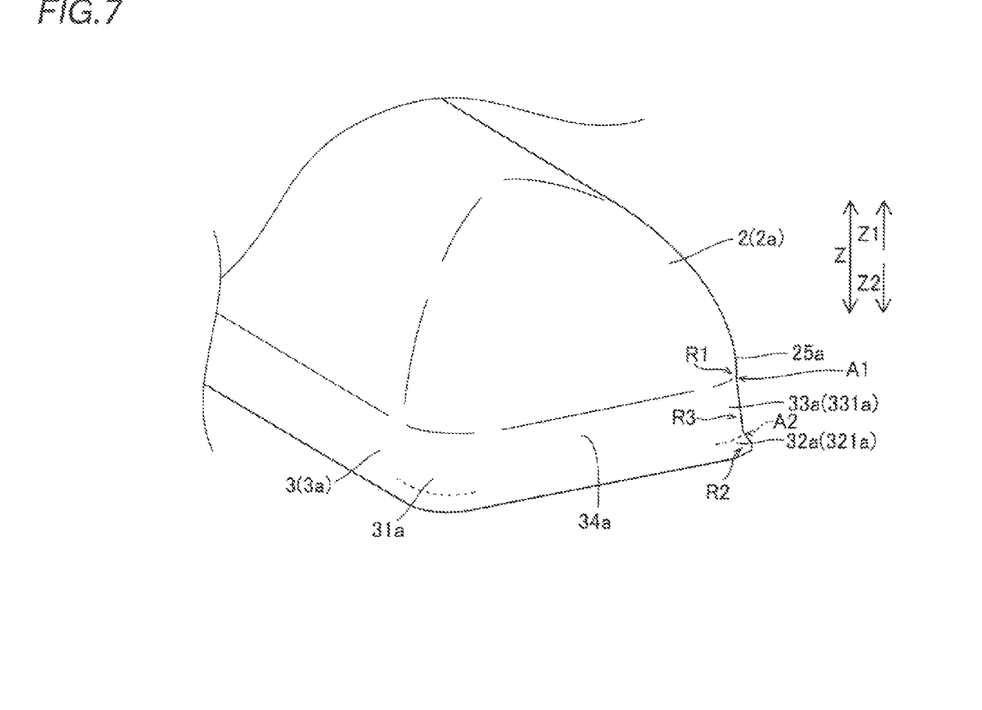
FIG. 7 A perspective view of the intermediate member and the header portion of the heat exchanger according to the embodiment of the present invention.
Figure 8:
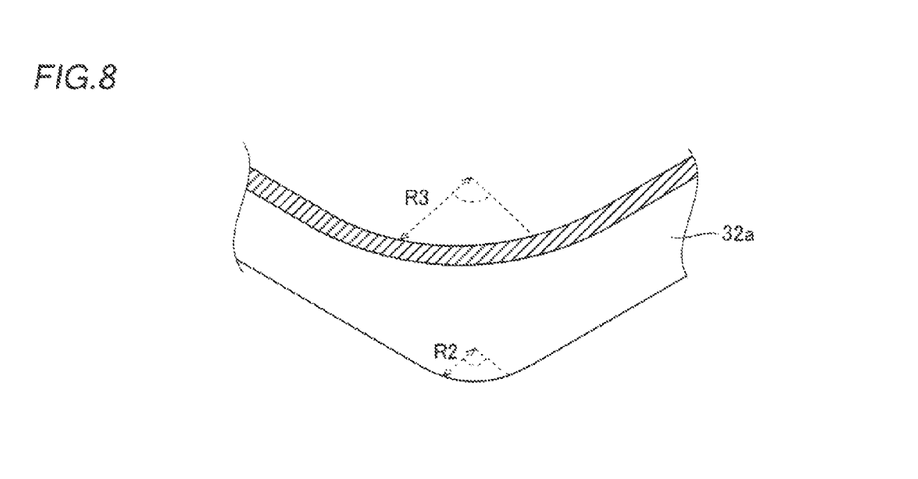
FIG. 8 A perspective view of a curvature radius changing portion of the intermediate member of the heat exchanger according to the embodiment of the present invention.

As shown in FIGS. 6 and 7, portions (linear portions 25a) of the header portion 2a closer to the intermediate member 3a (Z2-direction side) are formed substantially linearly (in a flat plate shape) along a direction Z (vertical direction). Due to the formation by press working, the four corners 22a of the header portion 2a are configured such that curvature radii R1 at boundaries A1 (portions in contact with the intermediate member 3a; see FIG. 6) between curvature radius non-changing portions 33a of the intermediate member 3a described later and the header portion 2a are at least three times the thickness t2 (see FIG. 6) of the header portion 2a. Inside the header portion 2a, a plate-like rectification portion 26a (see view (a) of FIG. 9) that rectifies the first fluid flowing into the core portion 1 is provided. The structure of the header portion 2b (corners 22b etc.) is the same as the structure of the header portion 2a.

The header portion 2c and the header portion 2d are also formed, by press working, in substantially rectangular shapes in which four corners 22c and four arcuate corners 22d have arcuate shapes with curvature radii of at least three times the respective thicknesses of the header portions 2c and 2d, as viewed in a direction in which the header portion 2c and the header portion 2d are mounted (laterally), similarly to the header portion 2a. The lengths of the header portions 2c and 2d in a longitudinal direction are substantially equal to the lengths of the header portions 2a and 2b in a longitudinal direction, and the lengths of the header portions 2c and 2d in a short-side direction are less than the lengths of the header portions 2a and 2b in a short-side direction. The remaining structures of the header portions 2a and 2d are similar to the structures of the header portions 2a and 2b.

As shown in FIGS. 1 and 2, the intermediate members 3 (intermediate members 3a to 3d) are provided between the core portion 1 and the header portions 2 (header portions 2a to 2d), and each have a substantially rectangular frame shape. The intermediate members 3 (intermediate members 3a to 3d) are configured to bond the core portion 1 and the header portions 2 (header portions 2a to 2d) to each other. The intermediate members 3a to 3d have similar structures, and hence the intermediate member 3a is described below in detail.

According to this embodiment, the four corners 31a of the intermediate member 3a are configured such that curvature radii R2 at a core portion 1 side are smaller than curvature radii R3 at a header portion 2a side, as shown in FIGS. 5 to 8. Specifically, the intermediate member 3a includes curvature radius changing portions 32a and the curvature radius non-changing portions 33a. The curvature radius changing portions 32a are provided closer to the core portion 1, and are configured such that the curvature radii R2 at the core portion 1 side are smaller than curvature radii R3 at the header portion 2a side. The curvature radius non-changing portions 33a are connected to the curvature radius changing portions 32a, are provided closer to the header portion 2a, and are configured such that the curvature radii R3 of corners 331a are not substantially changed from the side of the core portion 1 toward the side of the header portion 2a. By press working, the intermediate member 3a is formed in a shape in which the curvature radii of the corners 31a are changed.

More specifically, the curvature radii R3, at the header portion 2a side, of the four corners 321a of the curvature radius changing portions 32a are at least three times (at least 3t) the thickness t2 of the header portion 2a, and the curvature radii R2, at the core portion 1 side, of the four corners 321a of the curvature radius changing portions 32a are substantially one and a half times (substantially 1.5t) the thickness t2 of the header portion 2a. In other words, portions, closer to the core portion 1, of the corners 321a of the curvature radius changing portions 32a each are formed in a shape closer to a right angle as compared with portions, closer to the header portion 2a, of the corners 321a of the curvature radius changing portions 32a. The curvature radii R3 of the four corners 331a of the curvature radius non-changing portions 33a are substantially equal to the curvature radii R1 (at least 3t) of the header portion 2a at the boundaries A1 (see FIGS. 6 and 7) between the curvature radius non-changing portions 33a and the header portion 2a.

The four corners 321a of the curvature radius changing portions 32a are configured such that the curvature radii are gradually and continuously reduced from the side of the header portion 2a toward the side of the core portion 1. More specifically, the curvature radii of the four corners 321a of the curvature radius changing portions 32a are gradually reduced from at least three times (at least 3t) the thickness t2 of the header portion 2a to substantially one and a half times (substantially 1.5t) the thickness t2 of the header portion 2a.

At boundaries A2 (see FIGS. 6 and 7) between the curvature radius changing portions 32a and the curvature radius non-changing portions 33a, the curvature radii R3 of the corners 321a of the curvature radius changing portions 32a are substantially equal to the curvature radii R3 of the corners 331a of the curvature radius non-changing portions 33a. More specifically, the curvature radii of the corners 31a are gradually increased from the side of the core portion 1 toward the side of the header portion 2a, and are not changed from the boundaries A2 between the curvature radius changing portions 32a and the curvature radius non-changing portions 33a to the boundaries A1 between the curvature radius non-changing portions 33a and header portion 2a. Portions (connection portions 34a that connect a corner and a corner to each other) of the intermediate member 3a other than the four corners 31a each have a flat plate shape including a flat surface from the side of the core portion 1 to the side of the header portion 2a.

According to this embodiment, in a direction (direction Z) perpendicular to a surface of the core portion 1 on which the intermediate member 3a is mounted, the lengths L1 of the curvature radius non-changing portions 33a are more than the lengths L2 of the curvature radius changing portions 32a (L1>L2), as shown in FIG. 6. The lengths L1 of the curvature radius non-changing portions 33a are at least twice and not more than three times the lengths L2 of the curvature radius changing portions 32a, for example.

The structure of the intermediate member 3b is the same as the structure of the intermediate member 3a. The lengths of the intermediate members 3c and 3d in a longitudinal direction are substantially equal to the lengths of the intermediate members 3a and 3b in a longitudinal direction, and the lengths of the intermediate members 3c and 3d in a short-side direction are less than the lengths of the intermediate members 3a and 3b in a short-side direction. The remaining structures of the intermediate members 3c and 3d are similar to the structures of the intermediate members 3a and 3b. More specifically, the corners 31b to 31d of the intermediate members 3b to 3d are also configured such that curvature radii at core portion 1 sides are smaller than curvature radii at header portion 2b to 2d sides, similarly to the intermediate member 3a.

According to this embodiment, the header portion 2a and the intermediate member 3a are bonded to each other by welding. When the catalyst with which the core portion 1 is filled is replaced, the header portion 2a is cut at portions (the boundaries A1 between the header portion 2a and the curvature radius non-changing portions 33a) welded to the intermediate member 3a (curvature radius non-changing portions 33a), the catalyst is replaced, and thereafter the header portion 2a and the intermediate member 3a (curvature radius non-changing portions 33a) are bonded again to each other by welding. The header portion 2b is also cut and welded similarly to the header portion 2a. A method for replacing the catalyst is described later in detail.

Figure 3:
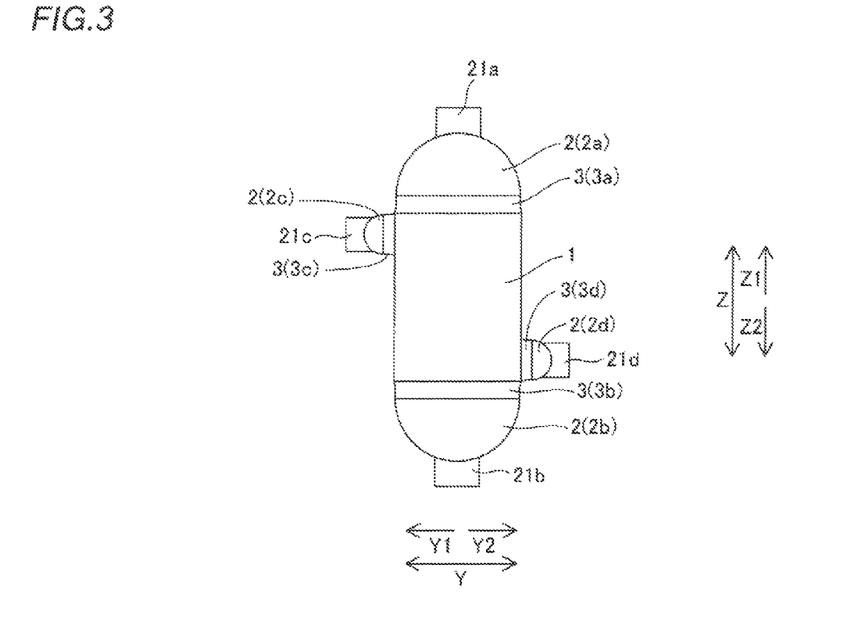
FIG. 3 A side elevational view of the heat exchanger according to the embodiment of the present invention, as viewed from an X-direction side.
Figure 4:
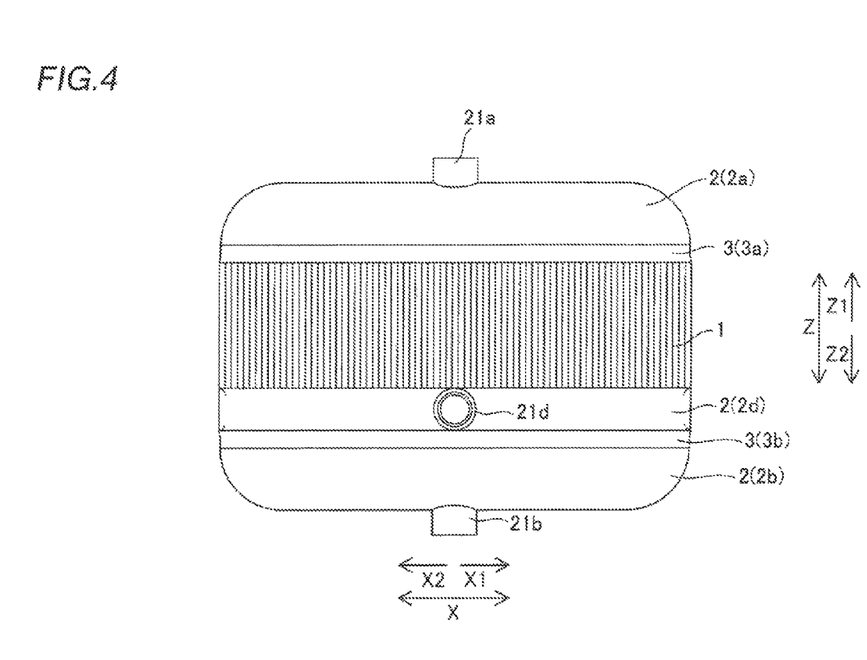
FIG. 4 A side elevational view of the heat exchanger according to the embodiment of the present invention, as viewed from a Y-direction side.

The flow of the fluids in the heat exchanger 100 is now described with reference to FIG. 3.

The first fluid flows into the inflow/outflow port 21a of the header portion 2a. Then, the first fluid flowing in from the header portion 2a flows through the core portion 1 vertically downward (in a direction Z2), and flows out through the inflow/outflow port 21b of the header portion 2b. The second fluid flows into the inflow/outflow port 21c of the header portion 2c. Then, the second fluid flowing in from the header portion 2c flows through the core portion 1 from the Y1-direction side to the Y2-direction side in an L-shape (or a Z-shape), and flows out through the inflow/outflow port 21d of the header portion 2d.

The method for replacing (process for replacing) the catalyst is now described in detail with reference to FIG. 9. Assume here that the flow paths 14 (see FIG. 5) through which the first fluid flows are filled with the catalyst.

First, the header portion 2a and the header portion 2b are cut. Operations on the header portion 2b are the same as those on the header portion 2a, and hence the header portion 2a is described below. Specifically, from a state where the header portion 2a is welded to the intermediate member 3a (a state before replacement), as shown in view (a) of FIG. 9, the header portion 2a (linear portions 25a) is substantially horizontally cut at the boundaries (height positions h1 from the core portion 1) between the header portion 2a and the curvature radius non-changing portions 33a of the intermediate member 3a, as shown in view (b) (left view) of FIG. 9. The header portion 2a is cut at portions welded to the curvature radius non-changing portions 33a, whereby the header portion 2a and the curvature radius non-changing portions 33a are formed with heat-affected portions 27a and 35a, respectively. Then, in the vicinity of the portions of the header portion 2a welded to the curvature radius non-changing portions 33a, the thickness t1 of each of portions of the header portion 2a and the curvature radius non-changing portions 33a scraped off due to thermal effects is up to a value expressed by the following formula (2) where t2 is the thickness of the header portion 2a, and each of the header portion 2a and the curvature radius non-changing portions 33a is scraped off by the thickness t1.

[Mathematical Formula 3]

$$t1 = 2.0 \times \sqrt{t2} \quad (2)$$

Figure 9:
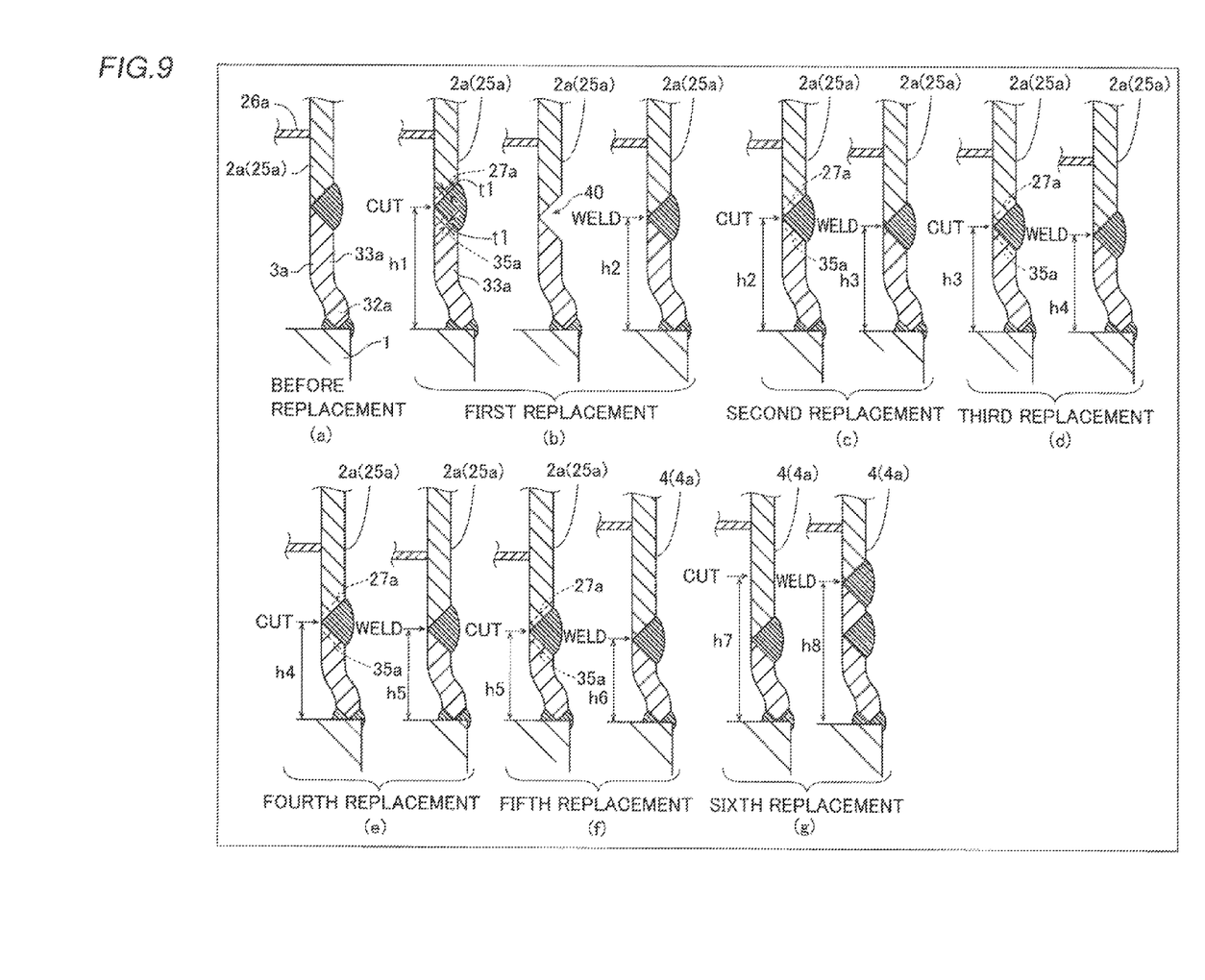
FIG. 9 A diagram for illustrating a method for replacing a catalyst in the heat exchanger according to the second embodiment of the present invention.

Then, as shown in view (b) (central view) of FIG. 9, grooves 40 are formed in portions of the header portion 2a scraped off by the thickness t1 and portions of the intermediate member 3a (curvature radius non-changing portions 33a) scraped off by the thickness t1. The grooves 40 each have a substantially V-shape, as viewed laterally (a direction perpendicular to the plane). The grooves 40 each may be formed in a shape other than the substantially V-shape according to the plate thickness and the welding conditions.

Then, the catalyst with which the flow paths 14 of the core portion 1 are filled is removed, and the core portion 1 is cleaned. Then, the flow paths 14 are filled with a catalyst.

Then, the header portion 2a and the intermediate member 3a (curvature radius non-changing portions 33a) both formed with the grooves 40 are bonded again to each other by welding at height positions h2 (<h1) smaller than the height positions h1, as shown in view (b) (right view) of FIG. 9. Thus, the first replacement of the catalyst is terminated.

As shown in view (c) to view (f) of FIG. 9, replacement of the catalyst is repetitively performed every predetermined period (every few years, for example). In this case, when respective catalysts are replaced, the heat-affected portions 27a of the header portion 2a and the heat-affected portions 35a of the intermediate member 3a are scraped off, and hence the lengths of the header portions 2a and the intermediate member 3a (curvature radius non-changing portions 33a) are gradually reduced. More specifically, height positions for welding or cutting become smaller in order of h2, h3, h4, and h5. Thus, after the fifth replacement of the catalyst is terminated, the lengths of the header portion 2a and the intermediate member 3a (curvature radius non-changing portions 33a) become lengths (height positions h6) not allowing welding. Specifically, welding places are in the vicinity of an unshown temperature measurement port provided in the intermediate member 3a, and welding becomes not feasible.

Thus, in the fifth replacement of the catalyst, not the header portion 2a used until now but a new header portion 4 is welded to the intermediate member 3a after the catalyst is replaced, as shown in view (f) (right view) of FIG. 9. Then, in the sixth replacement of the catalyst, cutting is performed at linear portions 4a (height positions h7) of the header portion 4 located above places at which the header portion 4 is welded to the intermediate member 3a at the time of the fifth replacement of the catalyst, as shown in view (g) of FIG. 9. Then, the catalyst is replaced, and the header portion 4 is welded to the intermediate member 3a at height positions h8 (>h7). Thus, in the fifth replacement of the catalyst, the new header portion 4 is welded, whereby one more replacement (a total of six replacements) of the catalyst can be performed.

According to this embodiment, the following effects can be obtained. Although the effects regarding the header portion 2a and the intermediate member 3a are described below, similar effects are obtained also regarding the header portions 2b to 2d and the intermediate members 3b to 3d.

According to this embodiment, as hereinabove described, the curvature radii R2, at the core portion 1 side, of the corners 31a of the intermediate member provided between the core portion 1 and the header portion 2a are smaller than the curvature radii R3, at the header portion 2a side, of the corners 31a of the intermediate member, whereby the flow paths 14 provided in the corners 1a of the core portion 1 can be covered with the intermediate member 3a, and hence the header portion 2a and the intermediate member 3a can be bonded to each other even when the corners 22a of the header portion 2a each are formed in an arcuate shape. Consequently, even when the corners 22a of the header portion 2a each are formed in an arcuate shape, the header portion 2a and the intermediate member 3a can be bonded to each other while exposure of the flow paths 14 of the core portion 1 to the outside is suppressed.

According to this embodiment, as hereinabove described, the heat exchanger 100 is the catalytic reactor in which the core portion 1 is filled with the catalyst, and the intermediate member 3a includes the curvature radius changing portions 32a provided closer to the core portion 1, of which the curvature radii R2 at the core portion 1 side is smaller than the curvature radii R3 at the header portion 2a side, and the curvature radius non-changing portions 33a connected to the curvature radius changing portions 32a and provided closer to the header portion 2a, of which the curvature radii of the corners 331a are not substantially changed from the side of the core portion 1 toward the side of the header portion 2a. When the core portion 1 of the heat exchanger 100 is filled with the catalyst so that the heat exchanger 100 is used as the catalytic reactor, it is necessary to periodically replace the catalyst. In this case, it is necessary to replace the catalyst and mount the header portion 2a by welding again after the welded header portion 2a is cut at the boundaries A1 between the header portion 2a and the intermediate member 3a. At this time, the heat-affected portions 27a and 35a generated at the boundaries A1 between the header portion 2a and the intermediate member 3a due to heat during welding are scraped off before welding. Thus, according to this embodiment, the intermediate member 3a includes the curvature radius non-changing portions 33a, of which the curvature radii of the corners 331a are not substantially changed from the side of the core portion 1 toward the side of the header portion 2a, whereby the curvature radii R3 of the curvature radius non-changing portions 33a are not changed by cutting at the boundaries A1 between the curvature radius non-changing portions 33a and the header portion 2a even when the heat-affected portions 35a of the curvature radius non-changing portions 33a are scraped off, and the curvature radii R1 of the header portion 2a are also not changed by cutting at the boundaries A1 between the curvature radius non-changing portions 33a and the header portion 2a even when the heat-affected portions 27a of the header portion 2a are scraped off. Thus, the curvature radius non-changing portions 33a and the header portion 2a can be easily welded to each other after the heat-affected portions 35a are scraped off.

According to this embodiment, as hereinabove described, in the direction perpendicular to the surface of the core portion 1 on which the intermediate member 3a is mounted, the lengths L1 of the curvature radius non-changing portions 33a are more than the lengths L2 of the curvature radius changing portions 32a. As described above, when the heat exchanger 100 is used as the catalytic reactor, it is necessary to periodically replace the catalyst. More specifically, cutting and welding of the header portion 2a are repetitively performed, and hence scraping off of the heat-affected portions 27a of the header portion 2a and the heat-affected portions 35a of the curvature radius non-changing portions 33a is also repetitively performed. Consequently, the lengths of the header portion 2a and the curvature radius non-changing portions 33a are gradually reduced. Thus, according to this embodiment, in the direction perpendicular to the surface of the core portion 1 on which the intermediate member 3a is mounted, the lengths L1 of the curvature radius non-changing portions 33a are more than the lengths L2 of the curvature radius changing portions 32a, whereby the number of times of cutting and welding (the number of times of replacement of the catalyst) of the header portion 2a can be increased due to the large lengths L1 of the curvature radius non-changing portions 33a.

According to this embodiment, as hereinabove described, the curvature radii of the corners 321a of the curvature radius changing portions 32a are gradually reduced from the side of the header portion 2a toward the side of the core portion 1. Thus, the shapes of the inner surfaces of the corners 321a of the curvature radius changing portions 32a become smooth (have small roughness) from the side of the header portion 2a toward the side of the core portion 1, and hence the fluids flowing into the flow paths 14 of the core portion 1 or flowing out of the core portion 1 can smoothly flow.

According to this embodiment, as hereinabove described, at the boundaries A2 between the curvature radius changing portions 32a and the curvature radius non-changing portions 33a, the curvature radii R3 of the corners 321a of the curvature radius changing portions 32a and the curvature radii R3 of the corners 331a of the curvature radius non-changing portions 33a are substantially equal to each other. Thus, the inner surfaces at the boundaries A2 are smoothly connected without any steps, and hence the fluids flowing into the flow paths 14 of the core portion 1 or flowing out of the core portion 1 can smoothly flow.

According to this embodiment, as hereinabove described, by press working, the header portion 2a is formed in a substantially rectangular shape having the four arcuate corners 22a, as viewed in the direction in which the header portion 2a is mounted, and the curvature radii R3 of the four corners 331a of the curvature radius non-changing portions 33a are at least three times the thickness t2 of the header portion 2a and are substantially equal to the curvature radii R1 of the header portion 2a at the boundaries A1 between the curvature radius non-changing portions 33a and the header portion 2a. Note that the curvature radii R1 of the corners 22a of the header portion 2a on which press working has been performed are at least one and a half times the thickness t2 of the header portion 2a. Thus, according to this embodiment, the curvature radii R3 of the corners 331a of the curvature radius non-changing portions 33a are at least three times the thickness t of the header portion 2a and are substantially equal to the curvature radii R1 of the header portion 2a at the boundaries A1 between the curvature radius non-changing portions 33a and the header portion 2a, whereby the header portion 2a on which press working has been performed can be easily welded to the curvature radius non-changing portions 33a.

According to this embodiment, as hereinabove described, the header portion 2a is formed by press working, whereby the header portion 2a can be easily formed, unlike the case where the header portion 2a is formed by welding multiple members.

According to this embodiment, as hereinabove described, the header portion 2a and the curvature radius non-changing portions 33a are bonded to each other by welding, and when the catalyst provided in the core portion 1 is replaced, the header portion 2a is cut at the portions welded to the curvature radius non-changing portions 33a and the catalyst is replaced, and thereafter the header portion 2a and the curvature radius non-changing portions 33a are bonded again to each other by welding. Thus, even when the heat-affected portions 35a of the curvature radius non-changing portions 33a are scraped off, the curvature radii R3 of the curvature radius non-changing portions 33a are not changed, and hence the curvature radius non-changing portions 33a and the header portion 2a can be easily welded to each other after the heat-affected portions 35a are scraped off. Consequently, replacement operations for the catalyst can be facilitated.

According to this embodiment, as hereinabove described, in the vicinity of the positions of the header portion 2a welded to the curvature radius non-changing portions 33a, the thickness t1 of each of the portions of the header portion 2a and the curvature radius non-changing portions 33a scraped off due to thermal effects is up to the value expressed by the above formula (2) where t2 is the thickness of the header portion 2a, and after each of the header portion 2a and the curvature radius non-changing portions 33a is scraped off by the thickness t1, the header portion 2a and the curvature radius non-changing portions 33a are bonded again to each other by welding. Thus, as compared with the case where portions other than the portions of the header portion 2a and the curvature radius non-changing portions 33a scraped off due to thermal effects are also scraped off, a reduction in the lengths of the header portion 2a and the curvature radius non-changing portions 33a is suppressed, and hence a change in the height position of the rectification portion 26a provided in the header portion 2a is suppressed. Consequently, an influence on a rectification effect caused by cutting of the header portion 2a can be suppressed.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the example in which the intermediate member includes the curvature radius changing portions, of which the curvature radii are changed, and the curvature radius non-changing portions, of which the curvature radii are not substantially changed, has been shown in the aforementioned embodiment, the present invention is not restricted to this. For example, the intermediate member may include only the curvature radius changing portions, of which the curvature radii are changed.

While the example in which in the direction perpendicular to the surface of the core portion, the lengths of the curvature radius non-changing portions are more than the lengths of the curvature radius changing portions has been shown in the aforementioned embodiment, the present invention is not restricted to this. For example, in the direction perpendicular to the surface of the core portion, the lengths of the curvature radius non-changing portions may be not more than the lengths of the curvature radius changing portions.

While the example in which the curvature radii of the corners of the curvature radius changing portions are gradually and continuously reduced from the side of the header portion toward the side of the core portion has been shown in the aforementioned embodiment, the present invention is not restricted to this. For example, the curvature radii of the corners of the curvature radius changing portions may be reduced in a stepwise fashion (in a staircase pattern) from the side of the header portion toward the side of the core portion.

While the example in which by press working, the header portion is formed in a substantially rectangular shape having the four arcuate corners has been shown in the aforementioned embodiment, the present invention is not restricted to this. For example, by a processing method other than press working, the header portion may be formed in a substantially rectangular shape having the four arcuate corners.

While the example in which the curvature radii of the four corners of the curvature radius non-changing portions are at least three times the thickness of the header portion has been shown in the aforementioned embodiment, the present invention is not restricted to this. For example, the curvature radii of the four corners of the curvature radius non-changing portions may be more than one and a half times and less than three times the thickness of the header portion to match the curvature radii of the header portion at the boundaries between the curvature radius non-changing portions and the header portion.

While the example in which the two header portions (the header portion 2a and the header portion 2b) of the four header portions are cut and are welded again when the catalyst provided in the core portion is replaced has been shown in the aforementioned embodiment, the present invention is not restricted to this. When the flow paths through which the second fluid flows are filled with the catalyst, for example, the header portion 2a and the header portion 2b may not be cut, but the header portion 2c and the header portion 2d may be cut and be welded again. Furthermore, regardless of the flow paths filled with the catalyst, all the four header portions 2a to 2d may be cut and be welded again.

While the example in which when the catalyst provided in the core portion is replaced, in the fifth replacement of the catalyst, not the header portion used until now but the new header portion is welded to the intermediate member after the catalyst is replaced has been shown in the aforementioned embodiment, the present invention is not restricted to this. For example, in the fifth replacement of the catalyst, the header portion used until now may be welded again after the catalyst is replaced.

While the example in which the heat exchanger is used as the catalytic reactor has been shown in the aforementioned embodiment, the present invention is not restricted to this. For example, the heat exchanger according to the present invention may be used as other than the catalytic reactor.

While the example in which each of the header portion and the curvature radius non-changing portions is scraped off by the thickness t1 up to the value expressed by the above formula (2) has been shown in the aforementioned embodiment, the present invention is not restricted to this. For example, each of the header portion and the curvature radius non-changing portions may be scraped off by the thickness t1 up to a value expressed by the following formula (3) where t2 is the thickness of the header portion. Thus, the heat-affected portions can be more reliably scraped off.

[Mathematical Formula 4]

$$t1 = 2.5 \times \sqrt{t2} \qquad (3)$$

DESCRIPTION OF REFERENCE SIGNS

1 Core portion
2, 2a, 2b, 2c, 2d Header portion
3, 3a, 3b, 3c, 3d Intermediate member
14 Flow path
22a, 22b, 22c, 22d Corner
31a, 31b 31c, 31d Corner
32a Curvature radius changing portion
33a Curvature radius non-changing portion
100 Heat exchanger
321a Corner
331a Corner

The invention claimed is:

1. A heat exchanger comprising:
a core portion that includes a flow path through which each of a first fluid and a second fluid flows, and exchanges heat between the first fluid and the second fluid;
a header portion that is mounted on the core portion and allows the first fluid or the second fluid to flow into the flow path or flow out of the flow path; and
an intermediate member that is provided between the core portion and the header portion, has a frame shape, and bonds the core portion and the header portion to each other, wherein
a curvature radius, at a core portion side, of a corner of the intermediate member is smaller than a curvature radius, at a header portion side, of the corner of the intermediate member.

2. The heat exchanger according to claim 1, wherein
the heat exchanger includes a catalytic reactor in which the core portion is filled with a catalyst, and
the intermediate member includes a curvature radius changing portion provided closer to the core portion, of which the curvature radius at the core portion side is smaller than the curvature radius at the header portion side, and a curvature radius non-changing portion connected to the curvature radius changing portion and provided closer to the header portion, of which a curvature radius of a corner is not substantially changed from a side of the core portion toward a side of the header portion.

3. The heat exchanger according to claim 2, wherein
by press working, the header portion is formed in a substantially rectangular shape having four arcuate corners, as viewed in a direction in which the header portion is mounted, and
curvature radii of four corners of the curvature radius non-changing portion are more than one and a half times a thickness of the header portion and are substantially equal to a curvature radius of the header portion at a boundary between the curvature radius non-changing portion and the header portion.

4. The heat exchanger according to claim 2, wherein
the header portion and the curvature radius non-changing portion are bonded to each other by welding, and
when the catalyst provided in the core portion is replaced, the header portion is cut at a portion welded to the curvature radius non-changing portion, the catalyst is replaced, and thereafter the header portion and the curvature radius non-changing portion are bonded again to each other by welding.

5. The heat exchanger according to claim 4, wherein
in a vicinity of the portion of the header portion welded to the curvature radius non-changing portion, a thickness t1 of each of portions of the header portion and the curvature radius non-changing portion scraped off due to a thermal effect is up to a value expressed by a following formula (1) where t2 is a thickness of the header portion, and
after each of the header portion and the curvature radius non-changing portion is scraped off by the thickness t1, the header portion and the curvature radius non-changing portion are bonded again to each other by welding;

[Mathematical Formula 1]

$$t1 = 2.0 \times \sqrt{t2} \qquad (1)$$

* * * * *